(12) United States Patent
Pascal

(10) Patent No.: US 7,375,159 B2
(45) Date of Patent: May 20, 2008

(54) VINYLIDENE FLUORIDEPOLYMER HAVING A FRACTION OF NON-TRANSFERRED CHAINS AND ITS MANUFACTURING PROCESS

(75) Inventor: Thierry Pascal, Charly (FR)

(73) Assignee: Atofina, Puteaux (FR)

( * ) Notice: Subject to any disclaimer, the term of this patent is extended or adjusted under 35 U.S.C. 154(b) by 483 days.

(21) Appl. No.: 11/029,629

(22) Filed: Jan. 6, 2005

(65) Prior Publication Data

US 2005/0165170 A1 Jul. 28, 2005

Related U.S. Application Data

(62) Division of application No. 10/195,329, filed on Jul. 16, 2002, now Pat. No. 6,989,427.

(30) Foreign Application Priority Data

Jul. 16, 2001 (FR) .................... 01 09453

(51) Int. Cl.
*C08F 114/18* (2006.01)

(52) U.S. Cl. ................ 525/88; 524/500; 526/249; 526/250; 526/255

(58) Field of Classification Search ................ 525/88; 524/500; 526/255, 250, 249
See application file for complete search history.

(56) References Cited

U.S. PATENT DOCUMENTS

| | | | | |
|---|---|---|---|---|
| 4,076,929 A | * | 2/1978 | Dohany | 526/255 |
| 4,141,874 A | * | 2/1979 | Oka et al. | 524/458 |
| 4,670,527 A | * | 6/1987 | Mizuno | 526/255 |
| 5,283,302 A | | 2/1994 | Wakamori et al. | |
| 5,324,785 A | | 6/1994 | Noda et al. | |
| 5,344,904 A | | 9/1994 | Wakamori et al. | |
| 6,207,758 B1 | * | 3/2001 | Brinati et al. | 525/200 |
| 6,465,577 B2 | * | 10/2002 | Okanishi et al. | 525/200 |
| 6,680,357 B1 | * | 1/2004 | Hedhli et al. | 525/326.2 |
| 6,762,245 B2 | * | 7/2004 | Bonnet et al. | 525/88 |
| 2005/0239508 A1 | * | 10/2005 | Schwarz et al. | 455/562.1 |

FOREIGN PATENT DOCUMENTS

| | | | |
|---|---|---|---|
| EP | 481509 A2 | * | 4/1992 |
| EP | 526216 A2 | * | 2/1993 |
| EP | 670353 A2 | * | 2/1995 |
| EP | 0824120 A1 | | 2/1998 |
| EP | 824120 A1 | * | 2/1998 |
| EP | 670353 B1 | | 8/1999 |
| EP | 1279685 A1 | * | 1/2003 |
| WO | WO99/29772 | | 12/1998 |

* cited by examiner

*Primary Examiner*—Peter D. Mulcahy
*Assistant Examiner*—Henry S. Hu
(74) *Attorney, Agent, or Firm*—Millen, White, Zelano, Branigan, P.C.

(57) ABSTRACT

Blends of PVDF (polyvinylidene fluoride) homopolymer or copolymer with ABC triblock copolymers are useful for manufacturing parts which may be sheets, film, tubes, rods, centrifugal pump components and containers. The PVDF comprises a fraction of non-transferred chains of very high molar mass which are insoluble in the usual solvents for PVDF, such as DMF (dimethylformamide), DMSO (dimethyl sulphoxide) and NMP (N-methylpyrrolidone), the polymer fraction associated with these high-mass chains having a dynamic viscosity of greater than 50 kpoise at 230° C., and at a shear rate of 100 s$^1$, and has spherulites with a size between 0.5 and 4μm.

14 Claims, 1 Drawing Sheet

Photographs taken using polarized light optical microscopy: Kynar® 740 and product from Example 1

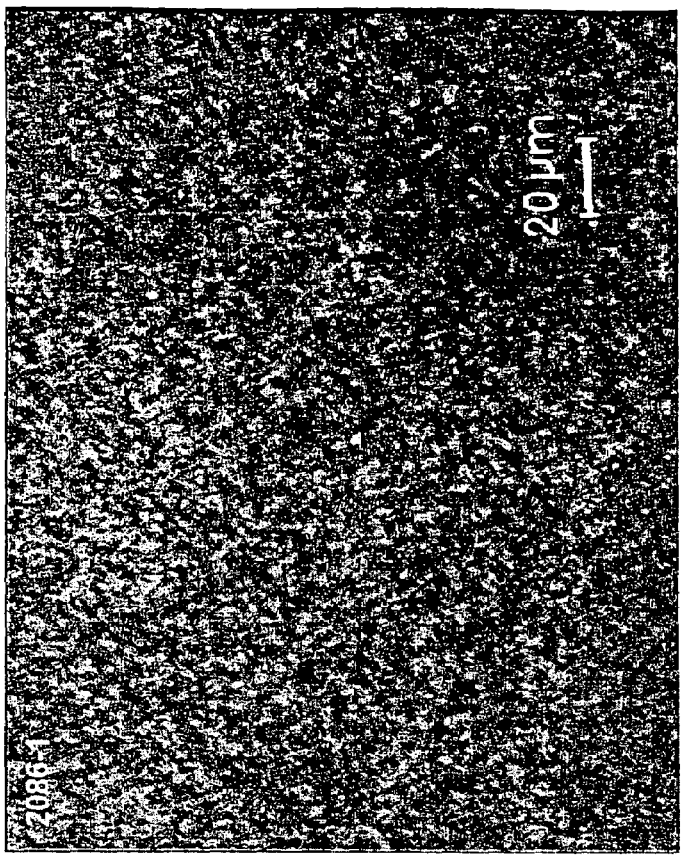
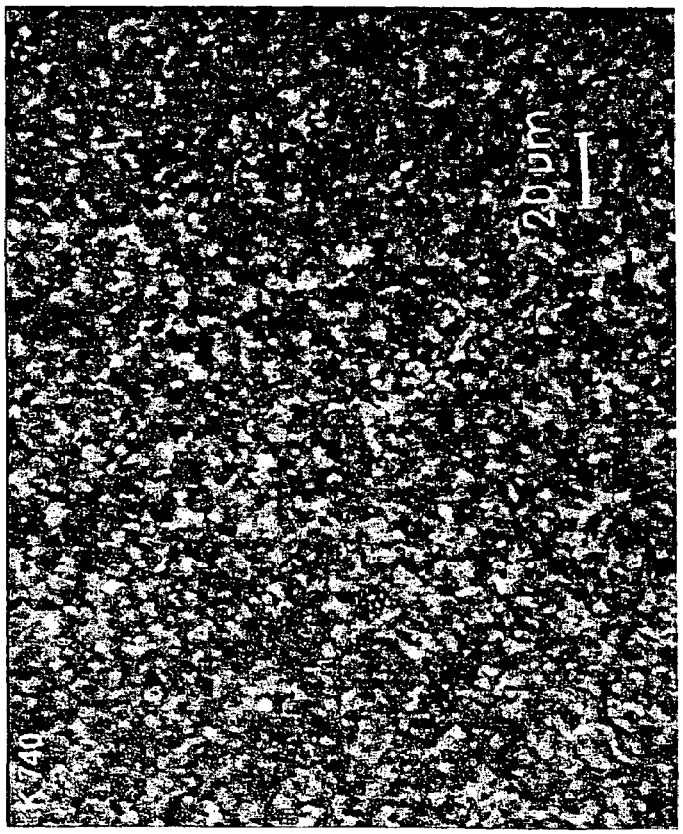
Photographs taken using polarized light optical microscopy: Kynar® 740 and product from Example 1

VINYLIDENE FLUORIDEPOLYMER HAVING A FRACTION OF NON-TRANSFERRED CHAINS AND ITS MANUFACTURING PROCESS

This is a divisional of application Ser. No. 10/195,329, filed Jul. 16, 2002, now U.S. Pat. No. 6,989,427.

FIELD OF THE INVENTION

Polymers based on vinylidene fluoride ($VF_2$), such as PVDF (polyvinylidene fluoride) for example, are known to provide excellent mechanical stability properties, very high chemical inertness and good ageing resistance. These properties are exploited in varied fields of application. Mention may be made, for example, of the manufacture of extruded or injection-moulded parts for the chemical engineering industry or for microelectronics, use in the form of sealing sleeves for the transportation of gases or hydrocarbons, production of films or coatings providing protection in the architectural field and production of protective components for electro-technical uses.

PRIOR ART AND TECHNICAL PROBLEM $VF_2$-based fluoropolymers and particularly PVDF have an impact strength which is not always sufficient. This drawback may have dramatic consequences as it may lead to the fracture of a part, either after a mechanical impact or after an unplanned period of time within a temperature range in which the toughness of the material is usually very poor (T=–30° C.). The prior art has already described impact-resistant PVDF compositions.

Patent EP 884 358 describes flexible and tough poly (vinylidene fluoride)-based compositions. They comprise, per 100 parts by weight of a vinylidene fluoride ($VF_2$) homopolymer (A) or a copolymer (A) of $VF_2$ with at least one other monomer copolymerizable with $VF_2$, in which copolymer, per 100 parts by weight of $VF_2$, the said monomer is present in an amount of between 0 and 30 parts by weight, from 0.5 to 10 parts by weight of an elastomer B and from 0.5 to 10 parts by weight of a plasticizer C, with the additional condition that the sum of B plus C be from 1 to 10.5 parts by weight and, moreover, that the vinylidene fluoride homopolymer (A) be chosen in such a way that it has a melt flow index, measured according to the ISO 1133 standard at 230° C. with a load of 5 kg, of less than 5 g/10 min and a critical modulus $G_C$, measured at 190° C., at the intersection of the shear moduli in the melt G' and G", of between 5 and 22 kPa. In general, they are suitable for the production of objects, articles such as sheets, films, sheaths of pipes, hoses, etc., subjected to stresses under high and/or low temperature conditions, in contact with particularly aggressive substances (such as hydrocarbons, strong acids, solvents, mineral and organic bases) during which their toughness and flexibility properties are particularly required (oil and gas industries, chemical engineering, construction industries and civil engineering).

International Application WO 99/29772 describes the reinforcement of PVDF with a poly(styrene)-poly(butadiene)-poly(methyl methacrylate) triblock copolymer. The PVDF thus modified retains its chemical resistance properties.

The incorporation of a plasticizing additive or elastomer is effective, but it poses problems of homogenization of the blend and of thermal or chemical stability depending on the nature of these additives. In addition, producing a formulation with plasticizers and/or elastomers represents an additional step in the manufacture of the final object.

It has now been found that a PVDF having a fraction of non-transferred chains has very good impact strength without it being necessary to add plasticizers or impact modifiers thereto. This polymer will be termed in the rest of the text "PVDF having a fraction of non-transferred chains" (FNTC). That is to say that this PVDF comprises very high-mass chains, namely non-transferred chains, and other PVDF chains which were produced by initiation and transfer. A very simple means of manufacturing this PVDF having a FNTC consists in starting the polymerization of $VF_2$ with an initiator which does not induce a transfer reaction, and in the absence of a transfer agent, then, after part of the PVDF has been formed, that having a very high molar mass, the transfer agent (also called chain regulator) is added. The chains of very high molar mass which correspond to the FNTC are completely insoluble in the usual solvents for PVDF, such as DMF (dimethylformamide), DMSO (dimethyl sulphoxide) and NMP (N-methylpyrrolidone). In addition, the polymer fraction associated with the FNTC has a dynamic viscosity of greater than 50 kpoise at 230 C and at a shear rate of 100 $s^{-1}$.

The prior art has described, in U.S. Pat. No. 4,076,929, a PVDF called a bimodal PVDF, but it is very different from that of the present invention. In this prior art, the polymerization of $VF_2$ is carried out in the presence of a surfactant and di-tert-butyl peroxide as initiator without adding a chain transfer agent. In fact, the tert-butyl peroxide also acts as a chain transfer agent since some of the hydrogens of its hydrocarbon part are labile. This transfer function is much weaker than a specific transfer agent such as ethyl acetate, but it is sufficient for the PVDF chains not to achieve very high masses, as in the present invention. It is therefore essential to produce high-mass chains—it is specified in column 2 lines 45-52 that the proportion of high-mass chains is from 30 to 70% and preferably at least 45%.

The prior art has described many processes for preparing PVDF, but a process has never been described in which the transfer agent is added after the start of a polymerization initiated specifically by a water-soluble non-organic initiator which does not induce a transfer reaction. As a reminder, mention may be made of the following patents:

Patent EP 387 938 describes the polymerization of $VF_2$ in the absence of an emulsifier with the aid of a peroxydisulphate as initiator and of a chain regulator added to the initial monomer charge. Patent EP 655 468 describes the polymerization of $VF_2$ in the presence of a radical initiator and of a chlorofluoroalkane (HCFC 123) as transfer agent. HCFC 123 is added either altogether at the start of the polymerization or in fractions during the polymerization, and it is very clear according to Example 1 that a fraction is added before the polymerization. Patent EP 169 328 describes the polymerization of $VF_2$ in the presence of a surfactant, an initiator, trichlorofluoromethane and isopropyl alcohol, the last two being transfer agents. The initiator is always added after some or all of the transfer agents. Patent FR 2 259 114 describes the polymerization of $VF_2$ in the presence of a radial initiator and a chain transfer agent, in which the initiator and the transfer agent are gradually added to the polymerization reactor at the same time as the $VF_2$ is added to the reactor in small proportions.

Another technical problem has also been solved. PVDF sometimes has too coarse a crystalline morphology, that is to say one consisting of crystalline entities (called spherulites) of too large a mean size or of too broad a size distribution. Among the negative consequences of such a morphology may be distinguished, for example, a high microroughness of objects obtained by melt processing, lack of gloss or a poor surface finish, and a lower transparency of the final material. In addition, a degradation in the mechanical properties upon prolonged contact with corrosive chemical substances may also result from a surface crystalline morphology which is not fine enough. The prior art has described means for reducing the mean size of the spherulites; nucleating agents are generally introduced into the fluoride-based matrix.

Japanese Patent Application JP48-34956 discloses a process for preparing a PVDF-based compound, consisting in mixing, into the PVDF latex or particles, from 0.05% to 30% of a fluororesin latex whose melting point is greater than that of PVDF. Such a fluororesin may be poly(vinyl fluoride), polytetrafluoroethylene (PTFE), polychlorotrifluoroethylene, or else resins chosen from homopolymers and copolymers of vinyl fluoride (VF), chlorotrifluoroethylene (CTFE), vinylidene fluoride ($VF_2$) and difluorodichloroethylene ($VF_2Cl_2$), resins whose melting point is higher than that of PVDF. From 0.05 to 30% by weight with respect to the latex PVDF of these fluororesins are normally added, the resin particles having a diameter of 0.05 to 1 μm. In Example 8, PVDF blended with 0.05 μm PTFE particles gave, after melting the PVDF at 250° C., a 1-mm thick plaque comprising spherulites of less than 1 μm in size.

Patents DE 2 116 847 and FR 2 721 036 describe the addition of aromatic or heterocyclic molecular compounds.

The effectiveness of certain nucleating agents has been clearly demonstrated, but their incorporation into a polyvinylidene fluoride matrix is always a tricky step. This is because the concentrations required are very low, typically of the order of 0.1% by weight, which makes it difficult to obtain a homogeneous dispersion.

A PVDF has now been discovered which has mean spherulite sizes of the order of 1 μm—this is the abovementioned PVDF having a fraction of non-transferred chains of the invention. It is manufactured without the addition of nucleating agents.

BRIEF DESCRIPTION OF THE INVENTION

The invention is a PVDF (polyvinylidene fluoride) homopolymer or copolymer, the comonomer being chosen from compounds containing a vinyl group capable of being opened by the action of free radicals in order to be polymerized and which contains, directly attached to this vinyl group, at least one fluorine atom, a fluoroalkyl group or a fluoroalkoxy group such that:

it comprises a fraction of non-transferred chains of very high molar mass which are completely insoluble in the usual solvents for PVDF, such as DMF (dimethylformamide), DMSO (dimethyl sulphoxide) and NMP (N-methylpyrrolidone), the polymer fraction associated with these high-mass chains having a dynamic viscosity of greater than 50 kpoise at 230° C. and at a shear rate of 100 $s^{-1}$, the size of the spherulites is between 0.5 and 4 μm.

The invention also relates to blends of this PVDF with an ABC triblock copolymer, the three blocks A, B and C being linked together in this order, each block being either a homopolymer or a copolymer obtained from two or more monomers, the A block being linked to the B block and the B block to the C block by means of a covalent bond or of an intermediate molecule linked to one of these blocks via a covalent bond and to the other block via another covalent bond, and such that:

the A block is compatible with PVDF,
the B block is incompatible with PVDF and is incompatible with the A block,
the C block is incompatible with PVDF, the A block and the B block.

The invention also relates to the parts made from the above composition. These parts may be sheets, films, tubes, rods, centrifugal pump components and containers.

The invention also relates to a process for synthesizing this PVDF, in which:

a dispersion of $VF_2$ (vinylidene fluoride) and of one or more optional comonomers in water is made, possibly with the aid of a surfactant, the said dispersion being initially brought into contact with a water-soluble non-organic initiator capable of causing the polymerization of the monomers;

then, part of the PVDF having been formed in the presence of the water-soluble non-organic initiator, the following are added:

either (i) a chain transfer agent capable of propagating the polymerization, the said polymerization then being initiated by a water-soluble non-organic initiator or by an organic initiator, or (ii) an organic initiator, also capable of accomplishing chain transfer, and optionally a water-soluble non-organic initiator.

The principle of this process is based on the formation, at the start of polymerization, of a fraction of macromolecular chains of very high molar mass, produced without a transfer agent (or without a side reaction of the transfer or termination type contributing to the chain length being greatly limited) and without an initiator capable of inducing a transfer reaction. The reaction therefore starts without a transfer agent (CTA) and the first charge of CTA is injected at a degree of conversion of the monomers of, for example, around 5% by weight. The necessary dose of CTA can then be introduced in increments or continuously, the total amount allowing the average molar mass of the polymer to be adjusted. In the case of a single injection of transfer agent, the product obtained will exhibit a bimodal distribution of the molar masses with a first population of very high mass and a second population of limited mass. The polymerization step after the first dose of transfer agent has been added may also be carried out under the effect of an organic initiator whose contribution to the transfer reactions will be of a greater or lesser importance.

In the particular case of an organic initiator having a transfer effect sufficient to adjust the molar mass, it is also possible to dispense with the actual transfer agent without changing the nature of the invention. In this case, the FNTC is still obtained during the first step of the polymerization in the presence of the non-organic initiator, and a second fraction of moderate molar mass is formed under the sole action of the organic initiator.

The invention makes it possible to improve the impact strength properties and the fineness of the morphology of PVDF merely by modifying the synthesis conditions, and more specifically by optimizing the way in which the transfer agent is introduced during polymerization and by initially using a water-soluble non-organic initiator. This process change takes place without any change to the apparatus for manufacturing the polymer and can thus be very rapidly transposed to an industrial production line.

DETAILED DESCRIPTION OF THE INVENTION

As examples of comonomers, mention may be made of vinyl fluoride; trifluoroethylene; chlorotrifluoroethylene (CTFE); 1,2-difluoroethylene; tetrafluoroethylene (TFE); hexafluoropropylene (HFP); perfluoro(alkyl vinyl) ethers, such as perfluoro(methyl vinyl) ether (PMVE), perfluoro (ethyl vinyl) ether (PEVE) and perfluoro(propyl vinyl) ether (PPVE); perfluoro(1,3-dioxole); perfluoro(2,2-dimethyl-1,3-dioxole) (PDD); the product of formula $CF_2=CFOCF_2CF(CF_3)OCF_2CF_2X$ in which X is $SO_2F$, $CO_2H$, $CH_2OH$, $CH_2OCN$ or $CH_2OPO_3H$; the product of formula $CF_2=CFOCF_2CF_2SO_2F$; the product of formula $F(CF_2)_nCH_2OCF=CF_2$ in which n is 1, 2, 3, 4 or 5; the product of formula $R_1CH_2OCF=CF_2$ in which $R_1$ is hydrogen or $F(CF_2)_z$ and z is 1, 2, 3 or 4; the product of formula $R_3OCF=CH_2$ in which $R_3$ is $F(CF_2)_z$— and z is 1, 2, 3 or 4; perfluorobutylethylene (PFBE), 3,3,3-trifluoropropene and 2-trifluoromethyl-3,3,3-trifluoro-1-propene. Several comonomers may be used.

Advantageously, the PVDF is chosen from vinylidene fluoride ($VF_2$) homopolymers and copolymers preferably containing at least 50% by weight of $VF_2$, the comonomer being chosen from chlorotrifluoroethylene (CTFE), hexafluoropropylene (HFP), trifluoroethylene ($VF_3$) and tetrafluoroethylene (TFE).

With regard to the proportion of non-transferred chains (of very high mass), this may represent up to 50% by weight of the PVDF and is advantageously between 2 and 30% by weight. This is the proportion with respect to the total amount of PVDF, that is to say that for 2 to 30% of chains of very high mass there are 98 to 70% of other chains, respectively. The proportion is preferably between 5 and 30% and better still between 15 and 25%. The insolubility of the chains of very high mass in the usual solvents for PVDF is found according to the rules of the art.

With regard to the size of the spherulites, this is advantageously between 0.8 and 2 μm. Typically, for a standard PVDF prepared at 80° C. by an emulsion process in the presence of a surfactant, an initiator and a transfer agent, the mean size is between 2 and 10 microns. This size is found in Kynar® 740 and Kynar® 1000, which are also PVDF homopolymers, whereas for a PVDF according to the present invention containing 25% by weight of chains of very high mass the mean size is of the order of 1 μm. Kynar® 740 and Kynar® 1000 are described in the comparative examples of the present invention.

Advantageously, the MFI (Melt Flow Index) is between 1 and 50 (in g/10 min at 230° C.–/5 kg). Preferably, the MFI of the PVDF of the invention is either between 1 and 3, and preferably between 1.5 and 2.5, or between 10 and 50, and preferably between 15 and 40.

The PVDFs of the invention exhibit good impact strength. In addition, they are highly pseudoplastic in nature (having a large drop in viscosity with shear rate), this generally being an advantage from the melt processing standpoint, and a newtonian plateau back towards the low shear rates, this being useful, for example, for the extrusion-blowing of thin films.

With regard to the ABC triblock copolymer: The C blockopolymer comprising at least three blocks A, B and C is such that the A block is linked to the B block and the B block to the C block by means of one or more single covalent bonds. In the case of several covalent bonds, between the A block and the B block and/or between the B block and the C block, there may be a single unit or a linked sequence of units serving to join the blocks together. In the case of a single unit, the latter may come from a monomer, called a moderator, used in the synthesis of the triblock. In the case of a linked sequence of units, this may be an oligomer resulting from the linking of monomer units of at least two different monomers in an alternating or random order. Such an oligomer may link the A block to the B block, and the same oligomer or a different oligomer may link the B block to the C block.

The A block of an ABC copolymer is regarded as being compatible with PVDF if the A polymer identical to this block (and therefore without B and C sequences) is compatible with this resin in the melt. Likewise, the A and B blocks are regarded as being incompatible if the A and B polymers identical to these blocks are incompatible. In general, compatibility between two polymers should be understood to mean the ability of one to dissolve in the other in the melt, or else their complete miscibility. If this is not the case, the polymers or blocks are called incompatible.

The lower the enthalpy of mixing of two polymers, the greater their compatibility. In some cases, there is a favourable specific interaction between the monomers which results in a negative enthalpy of mixing for the corresponding polymers. In the context of the present invention, it is preferred to use compatible polymers whose enthalpy of mixing is negative or zero.

However, the enthalpy of mixing cannot be conventionally measured for all polymers, and therefore the compatibility can only be determined indirectly, for example by viscoelastic analytical measurements in torsion or in oscillation, or else by differential calorimetry. For compatible polymers, two glass transition temperatures or $T_g$s can be detected for the blend: at least one of the two $T_g$s is different from the $T_g$s of the pure compounds and lies within the temperature range between the two $T_g$s of the pure compounds. A blend of two completely miscible polymers has a single $T_g$.

Other experimental methods may be used to demonstrate the compatibility of the polymers, such as turbidity measurements, light-scattering measurements and infrared measurements (L. A. Utracki, Polymer Alloys and Blends, pp. 64-117).

Miscible or compatible polymers are listed in the literature—see, for example J. Brandrup and E. H. Immergut : Polymer Handbook, 3rd Edition, Wiley & Sons 1979, New York 1989, pp. VI/348 to VI/364; O. Olabisi, L. M. Robeson and M. T. Shaw : Polymer Miscibility, Academic Press, New York 1979, pp. 215-276; L. A. Utracki : Polymer Alloys and Blends, Hanser Verlag, Munich 1989. The lists appearing in these references are given by way of illustration and are not, of course, exhaustive.

Advantageously, the A block is chosen from homopolymers and copolymers of alkyl (alkyl)acrylates, for example methyl methacrylate (MMA) and/or methyl or ethyl acrylate and/or those deriving from vinyl acetate.

Advantageously, the A block is poly(methyl methacrylate) (PMMA).

Preferably, this PMMA is syndiotactic and its glass transition temperature $T_g(A)$, measured by differential thermal analysis, is from +120° C. to +140° C.

Advantageously, the $T_g$ of B is less than 0° C. and preferably less than –40° C.

The monomer used to synthesize the elastomeric B block may be a diene chosen from butadiene, isoprene, 2,3-dimethyl-1,3-butadiene, 1,3-pentadiene and 2-phenyl-1,3-butadiene. Advantageously, B is chosen from polydienes, especially polybutadiene, polyisoprene and their random copolymers, or else from partially or completely hydrogenated polydienes. Among polybutadienes, it is advantageous to use those whose $T_g$ is the lowest, for example poly(1,4-butadiene) whose $T_g$ (around –90° C.) is less than that (around 0° C.) of poly(1,2-butadiene). The blocks B may also be hydrogenated. This hydrogenation is carried out using the standard techniques.

The monomer used to synthesize the elastomeric B block may also be an alkyl (meth)acrylate; the following $T_g$ values in brackets following the name of the acrylate are obtained: ethyl acrylate (−24° C.), butyl acrylate (−54° C.), 2-ethylhexyl acrylate (−85° C.), hydroxyethyl acrylate (−15° C.) and 2-ethylhexyl methacrylate (−10° C.). It is advantageous to use butyl acrylate. The acrylates are different from those of the A block in order to meet the condition of B and A being incompatible.

Preferably, the B blocks consist predominantly of poly(1, 4-butadiene) Preferably, the C block has a glass transition temperature $T_{g(C)}$ or a melting point $T_{m(C)}$ greater than the $T_{g(B)}$ of the B block. This characteristic means that the C block can either be in the glassy state or in a partially crystalline state and the B block can be in the elastomeric state, for the same service temperature $T_S$.

According to the present invention, it is possible to choose the nature of the B blocks in order to have a certain defined $T_{g(B)}$ and thus, at the service temperature $T_S$ of the material or of the article formed from the blend, to have these B polymer blocks in an elastomeric or flexible state. On the other hand, since the C polymer blocks can have a $T_{g(C)}$ or a $T_m$ greater than $T_{g(B)}$, they may be in a relatively rigid glassy state at the same service temperature.

Since the C blocks are incompatible with PVDF, the A blocks and the B blocks, they form a rigid discrete phase within the material, forming nanodomains included in the material and serving as anchoring in the region of one of the ends of each B block. The other end of each B block is linked to an A block which has a strong affinity with PVDF. This strong affinity provides a second anchoring in the region of the second end of the B block.

Advantageously, the C block is chosen from styrene or α-methylstyrene homopolymers or copolymers.

The triblocks which contain sequences deriving from alkyl (alkyl)acrylates may especially be prepared by anionic polymerization, for example using the processes described in Patent Applications EP 524 054 and EP 749 987.

Preferably, the ABC triblock is poly(methyl methacrylate-b-butadiene-b-styrene).

The ABC triblock copolymer may contain, as by-products of its synthesis, a BC diblock copolymer and possibly the homopolymer C. The ABC triblock copolymer may also contain, as by-products of its synthesis, an AB diblock copolymer and possibly the homopolymer A.

This is because the synthesis of a triblock copolymer is preferably carried out by joining, in succession, the A block to the B block and then to the C block, or conversely the C block to the B block and then to the A block, depending on the nature of the three blocks A, B and C, the A block being by definition that block which is compatible with PVDF. The ABC triblock copolymer may also contain star or symmetrical linear block copolymers of the ABC or CBC type.

Advantageously, the total amount by weight of the synthesis by-products, that is to say these homopolymers A, C or AB, BC, ABA and CBC block copolymers, is less than twice the amount of triblock ABC. Preferably, this amount is less than one times and better still 0.5 times the amount of triblock ABC. More specifically, the by-products are essentially the diblock BC, it being possible for the amount of BC to be between 25 and 35 parts by weight, per 75 to 65 parts of ABC respectively, and advantageously about 30 parts per 70 parts of ABC.

The number-average molecular mass ($M_n$) of the triblock copolymer, including the synthesis by-products, is greater than or equal to 20 000 g/mol, and preferably between 50 000 and 200 000 g/mol. Advantageously, the ABC triblock copolymer, including the by-products, consists of:

20 to 93 and preferably 30 to 70 parts by weight of A blocks;

5 to 68 and preferably 10 to 40 parts by weight of B blocks;

2 to 65 and preferably 5 to 40 parts by weight of C blocks.

The proportion of triblock ABC in the PVDF may be up to 30% by weight per 70% of PVDF. Advantageously, the triblock proportions are from 2 to 30% per 98 to 70% of PVDF respectively, and preferably 5 to 15% per 95 to 85% of PVDF respectively.

It would not be outside the scope of the invention to add to these PVDFs, whether or not containing ABC triblocks, stabilizers, fire retardants, plasticizers and impact modifiers.

With regard to the process for synthesizing this PVDF: one fundamental aspect of this process is that it relies on the use of (radical) initiator systems without any appreciable contribution to the transfer (or termination) reactions, either by their intrinsic chemical structure or by the chemical structure of their decomposition products. This is because, during the period of reaction without a CTA, minimum intervention of the transfer or termination reactions must be ensured. The present invention therefore applies particularly well to emulsion polymerization processes as these make it possible to carry out the initiation with water-soluble non-organic compounds such as, for example, persulphates or hydrogen peroxide, which have no secondary transfer effect. In contrast, most organic initiators that can be used for emulsion and/or suspension processes are not suitable because they intervene in the transfer or termination reactions (owing to the labile hydrogens present in the hydrocarbon part of their backbone). As examples of these initiators having labile hydrogens in their hydrocarbon part, mention may be made of di-tert-butyl peroxide. Of course, it should be understood that it is only the initial chain fraction of very high molar mass which must be produced under the influence of an initiator without contribution to the transfer (or termination) reactions. For the subsequent fractions formed in the presence of a transfer agent, the same initiator or an organic-type initiator may be employed without restriction. The CTA is added when the chains of very high mass have been formed. It would not be outside the scope of the invention to use an initiator which also contributes to the transfer such as, for example, an organic-type initiator. It would not be outside the scope of the invention subsequently to add another amount of initiator in one or more stages, the same initiator or an initiator contributing to the transfer, possibly another amount of monomers in one or more stages, and any combination of these possibilities.

The degree of conversion of the $VF_2$ and of the optional comonomers before the first injection of CTA determines the chain fraction formed without a transfer agent. The chains of very high mass having been formed, the number of injections or the rate of introduction of the CTA then determines the molar mass distribution of the fraction of PVDF which is not of very high mass. The total volume of CTA is not a critical parameter. It must be adjusted so as to fix the average molar mass of the polymer which is associated with the melt viscosity. The volume of water in which the dispersion of the monomers is made and the amounts of surfactant, initiator and CTA can be easily determined by a person skilled in the art. The polymerization is carried out in a stirred reactor and then the PVDF (in the form of solid particles) is separated from the water by any means. These techniques are known per se and are described in Patents U.S. Pat. No. 4,025,709, U.S. Pat. No. 4,569,978, U.S. Pat. No. 4,360,652, EP 626 396 and EP 655 468.

Advantageously, the aqueous emulsion is polymerized at a temperature of 50 to 130° C.

Preferably, the polymerization is carried out at an absolute pressure of 40 to 120 bar.

With regard to the surfactant: this denotes any product capable of dispersing the monomers in water so as to facilitate their polymerization. U.S. Pat. No. 4,025,709, U.S. Pat. No. 4,569,978, U.S. Pat. No. 4,360,652, EP 626 396 and EP 655 468 describe processes for synthesizing PVDF by putting the $VF_2$ into aqueous emulsion and polymerizing it; many formulae of surfactants will be found in these patents.

As examples, mention may be made of those of general formula: $ZC_nF_{2n}COOM$ in which Z is a fluorine or chlorine atom, n is an integer ranging from 6 to 13 and M is a hydrogen or alkali metal atom or an ammonium group or an ammonium group having at least one lower alkyl substituent.

Mention may also be made of lithium perfluoroalkanoates of formula $F_3C(CF_2)_{n-2}CO_2Li$ where n=7, 8, 9 or 10.

The amount of surfactant introduced at the start of or during the polymerization may be between 0.01 and 5 parts per 100 parts of water present in the initial charge of the reactor.

With regard to the water-soluble non-organic initiator capable of polmerizing the monomers, mention may essentially be made of inorganic peroxides, for example in the form of salts, such as sodium or potassium persulphate. The amount of initiator may be between 0.002 and 0.2 parts per 100 parts of monomers consumed in the reaction. Various coreactants well known to those skilled in the art may also be added to these inorganic peroxides to increase their rate of decomposition or to lower their temperature of use.

With regard to the organic initiator optionally employed to continue the reaction, mention may essentially be made of hydrocarbon peroxides such as di-tert-butyl peroxide, dicumyl peroxide or benzoyl peroxide, dialkyl percarbonates, such as diethyl percarbonate or diisopropyl percarbonate, peracids or peresters, such as t-butyl perpivalate, t-amyl perpivalate or t-butyl peroxybenzoate.

With regard to the transfer agent, this also denotes any product which makes it possible to limit the molar mass of the polymer, while still propagating the polymerization reaction. As examples, mention may be made of acetone, isopropanol, methyl acetate, ethyl acetate, diethyl ether, n-butyl acetate, diethyl malonate and diethyl carbonate, and of various chlorofluorocarbon compounds. The amount of transfer agent essentially depends on its nature and on the desired average molar mass of the polymer fraction obtained in its presence, which mass determines the average viscosity of the final product. Preferably, the transfer agent used represents from 0.01 to 5 parts per 100 parts of monomers consumed in the reaction.

BRIEF DESCRIPTION OF THE DRAWING

The Figure represents photographs taken using polarized light of Kynar® 740 and the product of Example 1.

EXAMPLES

Example 1

18.6 l of deionized water and 50 g of a perfluorinated anionic surfactant of the $C_8F_{17}CO_2NH_4$ type were introduced into a 30-litre autoclave.

The autoclave was closed and mechanically stirred intermittently, then vacuum-degassed, filled with nitrogen at a pressure of up to 10 bar, vacuum-degassed again, filled with $VF_2$ at a pressure of up to 5 bar and finally vacuum-degassed a last time. Next, the autoclave was heated to 85° C., the mechanical stirring being at 150 rpm, and then filled with $VF_2$ at an absolute pressure of up to 85 bar.

A 50 ml dose of a 0.5% by weight aqueous solution of potassium persulphate was added in a single step in order to start the reaction. The pressure was maintained at 85 bar by the continuous introduction of $VF_2$.

When 2.25 g of $VF_2$ had been consumed, 250 ml of ethyl acetate (EA) and 70 ml of the same aqueous potassium persulphate solution were added.

When 9 kg of $VF_2$ had been consumed, 20 ml of aqueous persulphate solution were incorporated in order to maintain a rate of conversion within the 1.5 to 3.5 kg/hour range.

When 9 kg of $VF_2$ had been consumed, the $VF_2$ feed was stopped and the reaction continued at a pressure of up to 42 bar before the temperature was lowered to 23° C. and the residual monomer removed from the autoclave.

This trial made it possible to produce 31.2 kg of a latex having a solids content of 39.5%, i.e. 12.3 kg of dry PVDF. The polymer fraction obtained before the transfer agent was introduced was 2.9 kg, i.e. 23.6% of the total of the product formed. The melt flow index measured according to the ISO 1133 standard at 230° C. under a load of 5 kg was 1.7 g/10 min.

Example 2

The procedure was as in Example 1, except for the additional introduction of 200 ml of EA when 9 kg of $VF_2$ had been consumed.

Example 3

$VF_2$/HFP Copolymer

The procedure was as in Example 1, except for the introduction of 105 g of hexafluoropropylene (HFP) after the initial degassing and before the pressurization to 85 bar and the feed with a $VF_2$/HFP mixture containing 1% by weight of HFP up to 2.25 kg of mixture consumed. After introducing the EA when the $VF_2$/HFP mixture had been added, the reaction was continued with just $VF_2$.

Example 4

The procedure was as in Example 1, except for the introduction of 480 ml of EA when 2.25 kg of $VF_2$ had been consumed.

Example 5

The procedure was as in Example 1, except for the introduction of 150 ml of EA when 1.2 kg of $VF_2$ had been consumed, and then 250 ml of EA when 2.25 kg of $VF_2$ had been consumed.

Example 6

$VF_2$/CTFE Copolymer

The procedure was as in Example 1, except for the introduction of 50 g of chlorotrifluoroethylene (CTFE), after the initial degassing and before pressurization to 85 bar, and the feed with a $VF_2$/CTFE mixture containing 2% by weight of CTFE up to 2.25 kg of consumption of the mixture. After introducing the EA when the VF$_2$/CTFE mixture had been added, the reaction was continued with just VF$_2$.

Example 7

The procedure was as in Example 1, except that the reaction was carried out at an absolute pressure of 45 bar, this pressure being kept constant all the time by a continuous VF$_2$ feed. The amount of deionized water initially put into the autoclave was also reduced to 17.6 litres. In addition, instead of initially introducing a 50 ml dose of a 0.5% aqueous persulphate solution, an 80 ml dose of the same solution was added. Finally, when 1.7 kg of VF$_2$ had been consumed, a 60 ml volume of EA was injected and the reaction continued by feeding the autoclave with an aqueous emulsion containing 2% by weight of n-propyl percarbonate (n-PP) at a rate of 300 ml/hour. The VF$_2$ feed was stopped when 7.1 kg of VF$_2$ had been consumed and the addition of the n-PP emulsion maintained at up to 10 bar, before the temperature was lowered to 23° C. and the residual monomer removed from the autoclave.

The ABC Triblock
was a PMMA-PB-PS (PMMA-polybutadiene-polystyrene) triblock having the following characteristics: the number-average molecular mass (M$_n$) of the PMMA blocks was 65 700 g/mol, the M$_n$ of the PB blocks was 22 800 and that of the PS blocks was 25 000. The ABC triblock was in fact a mixture of 60% by weight of a pure ABC triblock and 40% of a pure BC diblock, which was a synthesis intermediate; the BC diblock had a PC block of 25 000 M$_n$ and a PB block of 22 800 M$_n$.

The PMMA block represented 58% as mass fraction of the total mass of the triblock (i.e. of the sum of the pure triblock and the pure diblock), the PB block represented 20% as mass fraction of the total mass of the triblock (i.e. of the sum of the pure triblock and the pure diblock) and the PS block represented the remaining 22% (i.e. of the sum of the pure triblock and the pure diblock). It was prepared using the operating method described in EP 524 054 or EP 749 987.

The properties of the PVDF are given in Tables 1-3. These tables describe the mechanical and rheological properties of PVDF (or copolymers with a very low HFP or CTFE content). The data must be compared with industrial products having a comparable melt flow index level.

Firstly, with regard to the polymers suitable for being extruded (MFI≈2), that is to say Examples 1-3 and 6-7, it may be seen that the fracture energy at room temperature can be almost twice that of Kynar®1000 and four times that of Kynar® 740.

At −30° C., the effect is less pronounced, although an increase in the fracture energy of about 50% may be seen. On examining the tensile properties, it may also be seen that there is a significant increase (+8%) in terms of the yield stress in Examples 2-3, which means that the material has a greater resistance to plastic deformation.

In the case of the polymers aimed at injection moulding or coextrusion (MFI≈15-20), the effect on the fracture energy is greater at −30C than at room temperature, as demonstrated by the values obtained in the case of Examples 4-5 compared with the commercial grades, Kynar® 720 and 6000.

Based on the data obtained for the same products formulated with 10% of ABC triblock, Table 3 shows that the improvement in the impact behaviour resulting from the additive is decoupled at room temperature in the presence of the FNTC.

Finally, two photographs obtained using an optical microscope under polarized light from a microtome section on injection-moulded specimens allow the crystalline morphology of Kynar 740 to be compared with the product of Example 1. A reduction in the mean size of the spherulites is observed in the case of the PVDF containing the FNTC.

In the foregoing and in the following examples, all temperatures are set forth uncorrected in degrees Celsius; and, unless otherwise indicated, all parts and percentages are by weight.

The entire disclosure of all applications, patents and publications, cited above and below, and of corresponding French Application No. 0109453, filed Jul. 16, 2001 is hereby incorporated by reference.

TABLE 1

| Examples | MFI 230° C./5 kg g/10 min | Charpy impact −30° C. (kJ/m$^2$) | Charpy impact 23° C. (kJ/m$^2$) | Yield stress (MPa) | Yield elong. (%) | Tensile strength (MPa) | Elong. at break (%) | Rheology (Pa·s) 10 s$^{-1}$ | Rheology (Pa·s) 100 s$^{-1}$ | Rheology (Pa·s) 1000 s$^{-1}$ | Observations |
|---|---|---|---|---|---|---|---|---|---|---|---|
| Kynar ® 1000 PVDF homopolymer | 2 | 7.2 | 22.8 | 48.0 | 10.2 | 23.4 | 118 | 6625 | 1791 | 409 | |
| Kynar ® 740 PVDF homopolymer | 2 | 6.6 | 12.0 | 49.9 | 9.4 | 27.5 | 192 | 6741 | 1698 | 394 | |
| Ex 1 | 1.7 | 10.1 | 40.3 | 45.9 | 11.0 | 29.9 | 183 | 9092 | 2313 | 478 | ≈24% of non-transferred chains (chains of very high mass) |
| Ex 2 | 2.4 | 9.6 | 35.6 | 53.3 | 10.1 | 35.8 | 134 | 8077 | 2110 | 455 | +200 ml of EA after 9 kg of VF$_2$ had been consumed |
| Ex 3 | 2 | 8.9 | 33.8 | 54.0 | 11.3 | 34.6 | 153 | 7996 | 2129 | 456 | +HFP |
| Ex 6 | 1.8 | 9.5 | 41.8 | 43.8 | 10.6 | 35 | 255 | 13178 | 3388 | 714 | +CTFE |
| Ex 7 | 1.6 | 7.1 | 16.4 | 50.6 | 11 | 35.2 | 222 | 6882 | 1662 | 351 | +n-PP after 1.7 kg of VF$_2$ had been consumed |

TABLE 2

| Examples | MFI 230° C./5 kg g/10 min | Charpy impact −30° C. (kJ/m²) | Charpy impact 23° C. (kJ/m²) | Tensile properties Yield stress (MPa) | Tensile properties Yield elong. (%) | Tensile properties Tensile strength (MPa) | Tensile properties Elong. At break (%) | Rheology (Pa·s) 10 s⁻¹ | Rheology (Pa·s) 100 s⁻¹ | Rheology (Pa·s) 1000 s⁻¹ | Observations |
|---|---|---|---|---|---|---|---|---|---|---|---|
| Kynar® 720 PVDF homopolymer | 19 | 3.9 | 7.3 | 53.3 | 10.6 | 25.6 | 103 | 2422 | 908 | 248 | |
| Kynar® 6000 PVDF homopolymer | 18 | 3.9 | 8.5 | 51.1 | 9.9 | 31.4 | 40 | 2540 | 916 | 272 | |
| Ex 4 | 20.8 | 6.7 | 10.7 | 52.4 | 9.7 | 52.4 | 27 | 2369 | 891 | 260 | ≃24% of non-transferred chains |
| EX 5 | 16 | 9.1 | 11.9 | 46.7 | 11.8 | 32.0 | 67 | 2839 | 1023 | 291 | ≃13% of non-transferred chains + 250 ml of EA after 2.25 kg of VF₂ had been consumed |

TABLE 3

| Examples | MFI 230° C./5 kg g/10 min | Charpy impact −30° C. (kJ/m²) | Charpy impact 23° C. (kJ/m²) | Tensile properties Yield stress (MPa) | Tensile properties Yield elong. (%) | Tensile properties Tensile strength (MPa) | Tensile properties Elong. at break (%) | Rheology (Pa·s) 10 s⁻¹ | Rheology (Pa·s) 100 s⁻¹ | Rheology (Pa·s) 1000 s⁻¹ | Observations |
|---|---|---|---|---|---|---|---|---|---|---|---|
| Kynar® 720 + 10% SBM | | 9.2 | 15.8 | 41.2 | 8.2 | 23.2 | 24 | | | | |
| Ex 4 + 10% SBM | | 9.0 | 41.0 | 43.8 | 7.1 | 20.5 | 39 | | | | |
| Ex 5 + 10% SBM | | 10.2 | 38.6 | 45.3 | 8.2 | 29.5 | 95 | | | | |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A blend of a PVDF (polyvinylidene fluoride) homopolymer or copolymer of a comonomer containing a vinyl group capable of being opened by the action of free radicals in order to be polymerized and which contains, directly attached to this vinyl group, at least one fluorine atom, a fluoroalkyl group or a fluoroalkoxy group, said PVDF comprising:
   a fraction of non-transferred chains of which are insoluble in DMF, DMSO and NMP, said fraction having a dynamic viscosity of greater than 50 kpoise at 230° C. and at a shear rate of 100 s⁻¹, and a spherulites size of 0.5 to 4 μm,
   with an ABC triblock copolymer, blocks A, B and C being linked together in this order, each block being either a homopolymer or a copolymer obtained from two or more monomers, the A block being linked to the B block and the B block to the C block by means of a covalent bond or of an intermediate molecule linked to one of these blocks via a covalent bond and to the other block via another covalent bond, and such that:
   the A block is compatible with PVDF,
   the B block is incompatible with PVDF and is incompatible with the A block,
   the C block is incompatible with PVDF, the A block and the B block.

2. A blend according to claim 1, wherein the PVDF is a vinylidene fluoride (VF₂) homopolymer or copolymer of a comonomer which is chlorotrifluoroethylene (CTFE), hexafluoropropylene (HFP), trifluoroethylene (VF₃) or tetrafluoroethylene (TFE).

3. A blend according to claim 1, in which the proportion of non-transferred chains in the PVDF is 2 to 30% by weight.

4. A blend according to claim 3, in which the proportion of non-transferred chains in the PVDF is between 5 and 30% by weight.

5. A blend according to claim 4, in which the proportion of non-transferred chains in the PVDF is between 15 and 25% by weight.

6. A blend according to claim 1, in which the size of the spherulites in the PVDF is 0.8 to 2 μm.

7. A blend according to claim 1, in which the ABC triblock is poly(methyl Methacrylate-b-butadiene-b-styrene).

8. Parts made of the blend according to claim 1.

9. A process for synthesizing a blend according to claim 1, in which the PVDF is prepared by:
- a dispersion of $VF_2$ (vinylidene fluoride) and of one or more optional comonomers in water is made, optionally with the aid of a surfactant, said dispersion being initially brought into contact with a water-soluble non-organic initiator capable of causing the polymerization of the monomers;
- part of the PVDF having been formed in the presence of the water-soluble non-organic initiator, the following are added:
- either (i) a chain transfer agent capable of propagating the polymerization, the said polymerization then being initiated by a water-soluble non-organic initiator or by an organic initiator,
- or (ii) an organic initiator, also capable of accomplishing chain transfer, and optionally a water-soluble non-organic initiator.

10. A blend according to claim 2, in which the PVDF contains at least 50% by weight of $VF_2$.

11. A blend according to claim 1, in which the proportion of non-transferred chains in the PVDF is up to 50% by weight.

12. A blend of a (polyvinylidene fluoride) homopolymer or copolymer of a comonomer containing a vinyl group capable of being opened by the action of free radicals in order to be polymerized and which contains, directly attached to this vinyl group, at least one fluorine atom, a fluoroalkyl group or a fluoroalkoxy group, said PVDF comprising a fraction of non-transferred chains of which are insoluble in DMF, DMSO and NMP, said PVDF being produced by a process comprising polymerization in the absence of a transfer agent and with an inhibitor which does not induce a transfer reaction, whereby PVDF is formed, and subsequently continuing polymerization in the presence of a transfer agent,
- with an ABC triblock copolymer, blocks A, B and C being linked together in this order, each block being either a homopolymer or a copolymer obtained from two or more monomers, the A block being linked to the B block and the B block to the C block by means of a covalent bond or of an intermediate molecule linked to one of these blocks via a covalent bond and to the other block via another covalent bond, and such that:
  - the A block is compatible with PVDF,
  - the B block is incompatible with PVDF and is incompatible with the A block,
  - the C block is incompatible with PVDF, the A block and the B block.

13. A blend according to claim 12, wherein the fraction of non-transferred chains in the PVDF has a dynamic viscosity of greater than 50 kpoise at 230° C. and at a shear rate of 100 $s^{-1}$, and a spherulites size of 0.5 to 4 µm.

14. A blend according to claim 12, in which the proportion of non-transferred chains in the PVDF is up to 50% by weight.

* * * * *